(12) United States Patent
Stites

(10) Patent No.: US 8,720,312 B2
(45) Date of Patent: May 13, 2014

(54) HANDS-FREE QUICK-CHANGE AIR TOOL CONFIGURATION

(75) Inventor: Ernest D. Stites, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 562 days.

(21) Appl. No.: 12/851,271

(22) Filed: Aug. 5, 2010

(65) Prior Publication Data
US 2012/0031244 A1 Feb. 9, 2012

(51) Int. Cl.
*B23Q 5/06* (2006.01)

(52) U.S. Cl.
USPC .............................................. 82/152; 82/158

(58) Field of Classification Search
CPC ........................................................ B23Q 5/06
USPC .................. 82/121, 152, 158, 159; 408/56, 57
See application file for complete search history.

(56) References Cited

U.S. PATENT DOCUMENTS

| | | | | |
|---|---|---|---|---|
| 1,580,780 A | * | 4/1926 | Dixon et al. | 403/344 |
| 2,377,271 A | * | 5/1945 | Schumann | 464/17 |
| 2,452,268 A | * | 10/1948 | Schumann | 173/75 |
| 2,648,939 A | * | 8/1953 | Jennings et al. | 451/440 |
| 3,803,981 A | * | 4/1974 | Allgeyer | 409/193 |
| 4,058,937 A | | 11/1977 | Mitchell | |
| 4,992,012 A | * | 2/1991 | Cioci | 409/136 |
| 5,190,421 A | * | 3/1993 | Wen et al. | 408/56 |
| 5,669,743 A | * | 9/1997 | Johnson et al. | 408/56 |
| 7,013,775 B1 | * | 3/2006 | Song et al. | 82/158 |
| 7,137,763 B2 | * | 11/2006 | Lawson | 409/140 |
| 7,360,976 B2 | * | 4/2008 | Bryan | 409/230 |
| 7,568,867 B2 | * | 8/2009 | Bryan | 409/230 |
| 7,597,514 B2 | * | 10/2009 | Bryan | 409/131 |
| 2009/0095126 A1 | * | 4/2009 | Hyatt et al. | 74/822 |

OTHER PUBLICATIONS

Macro Technologies LLC, High Speed Air Spindle, Automatic Tool Change Series. From internet: http://www.macrotechnologies.com/high_speed_air_spindle_atc_mac.htm. Retrieved Jun. 7, 2011.
Zelinski, Peter. "Air-Powered High Speed Spindle." Modern Machine Shop, Sep. 15, 2000.
Finley Enterprises LLC, Finley Precision Spindles, 2009 [retrieved on Jun. 13, 2011 (Jul. 6, 2011)]. Retrieved from the internet: URL: http://www.finleyspindles.com.

* cited by examiner

*Primary Examiner* — Daniel Howell
*Assistant Examiner* — Nicole N Ramos
(74) *Attorney, Agent, or Firm* — Cantor Colburn LLP

(57) ABSTRACT

A hands-free quick-change air tool configuration for a machining apparatus includes a tool holder configured to receive a normally hand-held air operated tool. The air manifold is operably receptive of the tool holder. A plunger-type seal configuration is operably interconnected to an air supply and is in operable communication with the air manifold. A method for deburring a part in a machining apparatus is included.

12 Claims, 4 Drawing Sheets

HANDS-FREE QUICK-CHANGE AIR TOOL CONFIGURATION

BACKGROUND

Machine tools and particularly those having the possibility of performing multiple operations are ubiquitous in industry. Such tools as turret lathes have become an important tool for any machine shop to have and operate. While the tools certainly help production throughput, they often require tool changes and non-tool-change related operator intervention throughout a machining operation. Some operational changes can be effected through control systems located externally of the machine and some require an operator to access the interior of the machine. Accessing the interior of the machine can be messy due to coolants used and can potentially be dangerous if the operator fails to employ proper protocols.

In view of the foregoing, configurations that reduce operator intervention requirements are always welcomed by the art.

SUMMARY

A hands-free quick-change air tool configuration for a machining apparatus includes a tool holder configured to receive a normally hand-held air operated tool; an air manifold operably receptive of the tool holder; and a plunger-type seal configuration operably interconnected to an air supply and in operable communication with the air manifold.

A method for deburring a part in a machining apparatus includes installing the configuration as claims in claim 1 in a machining apparatus; inputting instructions to a control unit to cause the air tool to be aligned with the part; and inputting instructions to activate a solenoid associated with supplying air from an air source to the air manifold.

BRIEF DESCRIPTION OF THE DRAWINGS

Referring now to the drawings wherein like elements are numbered alike in the several Figures.

DETAILED DESCRIPTION

The invention described herein succeeds at both of reducing the need for operator intervention in machining operations by providing remotely actuatable air driven tool capability within the machine and reducing costs of adding tools having alternate capabilities than standard tools for such a machine by advantageously facilitating the use of normally hand-held air driven tools in the machine.

Figure 1:
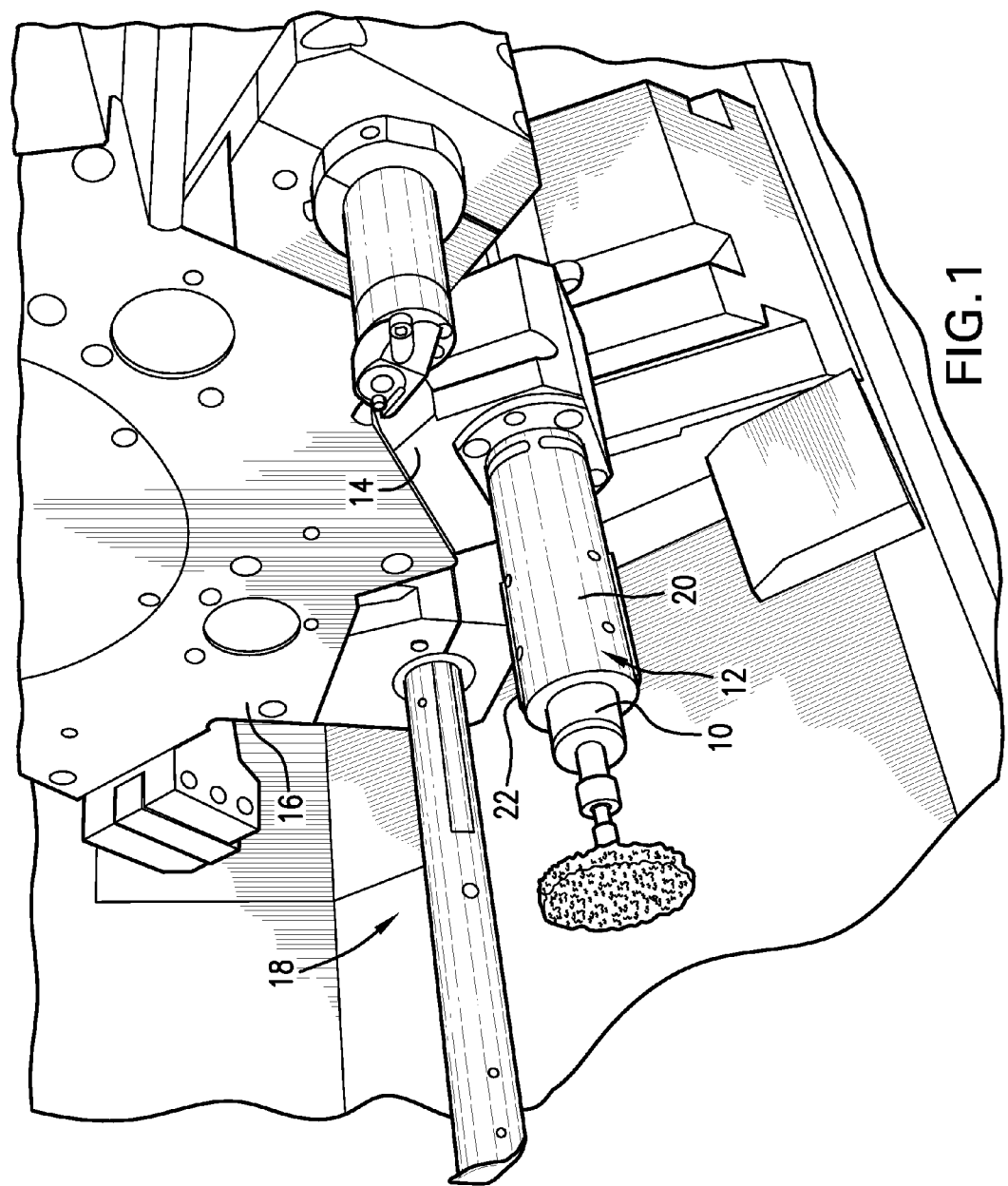
FIG. 1 is a representation of one embodiment wherein a standard hand-held air tool is mounted in a tool holder to a machining apparatus that is plumbed to provide air as a power fluid to the air tool.

Referring to FIG. 1, the reader's attention is directed to air tool 10, which is depicted in this embodiment as an air grinder. The air tool may be recognized by some as a standard type of air tool normally used in a hand-held paradigm. Tools like the depicted air tool 10 are ubiquitously available and inexpensive to purchase. They are powered by compressed air often referred to as "shop air", which is readily available in most machine shops for various purposes. In ordinary use, an operator will use a quick connect coupling (available everywhere in connection with air tools) to connect to and supply air to an air powered tool and then use that tool by hand to effect a result as desired.

In connection with this disclosure however, the air tool 10 is mounted in a tool holder 12 configured to be connected to an air manifold 14. The air manifold 14 is connected in a conventional way to a mounting location in a machining apparatus such as to a turret 16 of a turret lathe 18, as shown. The air tool 10 is secured in the tool holder 12 in an "on" position. As one familiar with the use of air tools will recognize, each tool has a configuration allowing an operator to operate the tool. In the case of an air grinder like that illustrated, the "switch" is commonly a paddle-type switch. In one embodiment of the invention, the tool holder 12 is configured to hold the paddle-type switch in the depressed position. In this position, a supply of pressurized air to the air tool in the tool holder will automatically cause the air tool to operate. In one embodiment, the tool holder 12 is configured as two pieces. A body 20 cooperates with a cap 22 to mount and hold the air tool 10 therein. As illustrated the body and cap are secured to one another using a number of fasteners.

Figure 3:
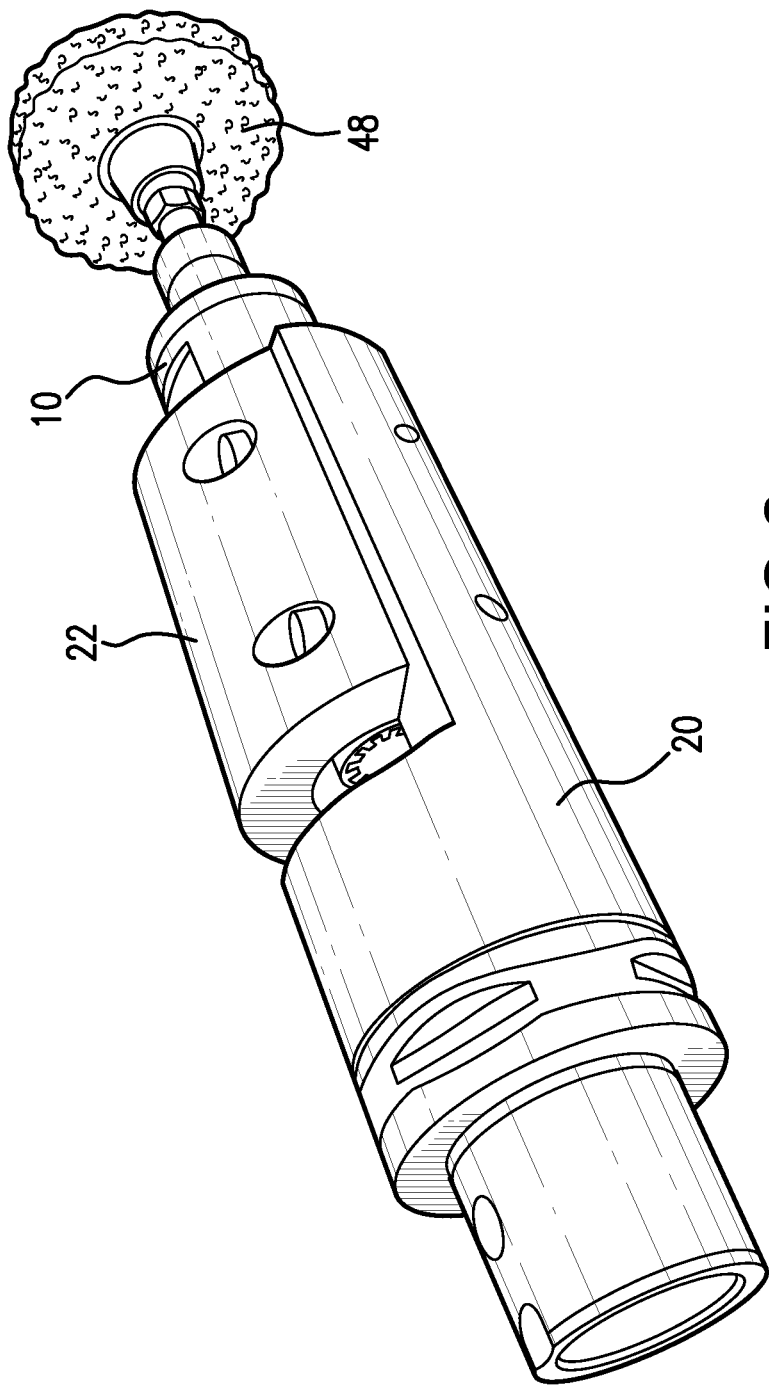
FIG. 3 is a view of the tool holder and air tool depicted in FIG. 1.
Figure 4:
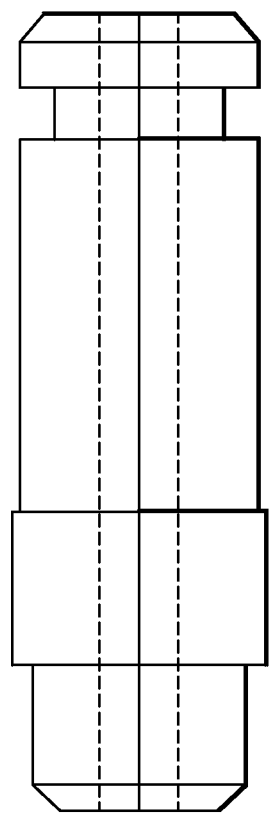
FIG. 4 is a view of an air connector configured for reception in the air tool and an air manifold.

Air tools and other air driven accessories will also have an air inlet. The air inlet is very well known and hence does not require illustration. Suffice to say that it is in many cases at a base of the air tool and is so with the air tool depicted in FIGS. 1 and 3 hereof. In order to provide quick and easy air connection, an NPT (national pipe tapered) connection (see FIG. 4) is provided for threaded connection to the air tool 10 and mounted connection to the air manifold 14.

Figure 2:
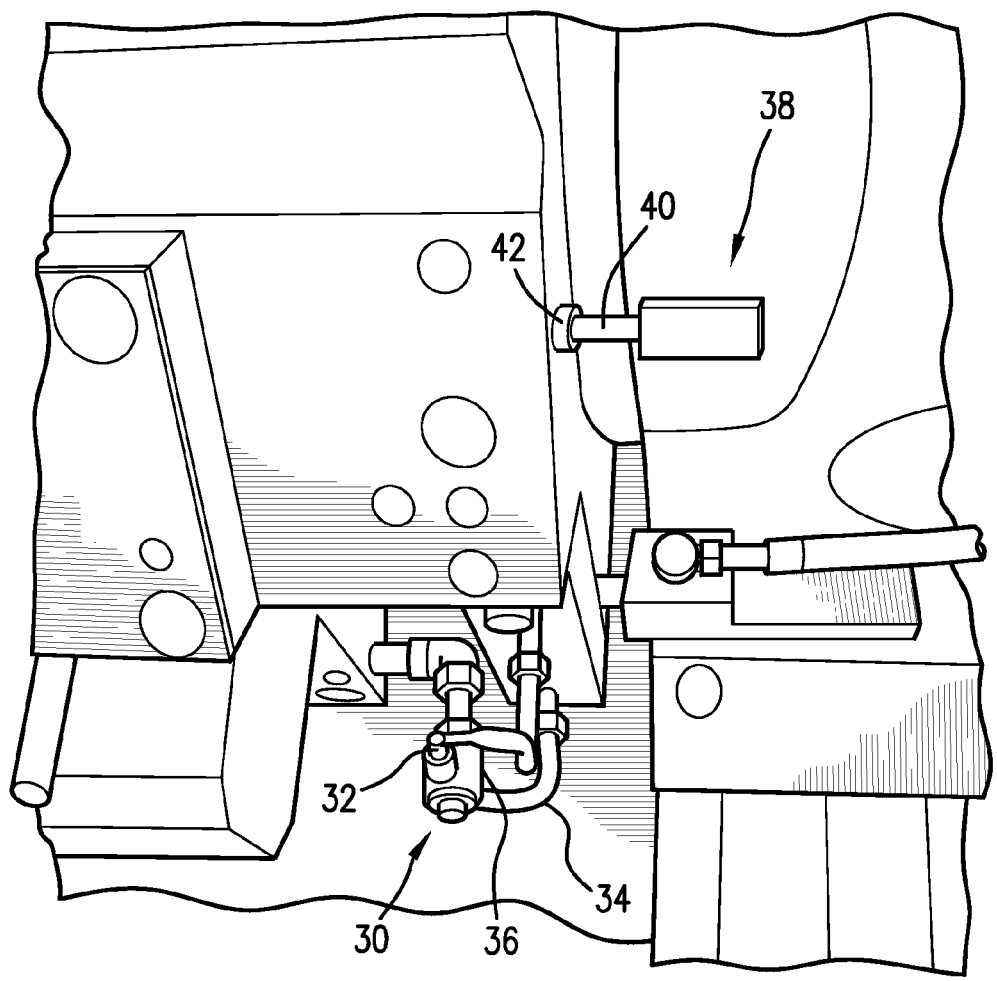
FIG. 2 is a view of the turret depicted in FIG. 1 from a reverse vantage point illustrating the air/coolant plumbing configuration.

Referring to FIG. 2 a part of the air manifold 14 is visible, the view being from behind the turret 16 shown in FIG. 1. This portion of the air manifold is referred to herein for convenience as plumbing 30. Plumbing 30 includes an air inlet 32 and a liquid inlet 34 that both feed a switchable fluid port 36. Switchable fluid port 36 is connected to a fluid conduit 38 that feeds the air tool 10. The port 36 is switchable to feed air or coolant depending upon what tool is connected to the turret 16. If a conventional tool is connected to the turret 16 in the relevant position, a coolant supply would be desirable whereas if an air powered tool is connected in that position as illustrated in FIG. 1, air would be provided to the tool 10.

In order to feed pressurized air to the plumbing 30, a plunger-type fluid sealing arrangement 40 is employed (see FIG. 2). This is similar to those commercially available to convey cooling fluid to a turret 16 but in connection with the disclosure hereof is used for air conveyance, a fluid not normally conveyed to a turret 16. When the turret moves to a locked position after rotation, the plunger type fluid sealing arrangement 40 will be in compressed engagement with a seal port 42, commonly both made of polytetrafluoroethylene or other relatively hard, long wearing yet deformable material. When the components 40 and 42 are pressed together by the turret moving to the locked position, the connection between 40 and 42 is capable of conveying pressurized fluid, in this case air or other compressed gas that is capable of powering an air type tool.

The configuration allows for pressurized air to be available within the machine via solenoid actuation and for an air powered tool to be mounted and operated within the machine without an operator even opening the door to the machine. Thereby, the operator is protected from his or her own failure to follow safety protocols and overall safety is thus enhanced through the employment of the configuration as disclosed.

In a particular embodiment of the invention disclosed herein a deburring function is enabled by the configuration disclosed. Conventionally deburring of a machined part would be effected by an operator opening a machine door and reaching in with a deburring tool to debur the part while the machine rotated the part being machined. Made possible by the configuration disclosed herein however, the air tool is tipped with a bit 48 capable of deburring the part being machined. To accomplish the deburring operation, the operator merely programs the machine to rotate the turret 16 to align the tool 10 with the part and activate the pressurized air flow. The air tool will then debur the part without the door of the machine being opened by the operator and the operator need not reach into the machine at all.

It is to be appreciated that not only does the invention increase operator safety and improve efficiency in machining; it also enables the use of inexpensive air tools in place of very expensive alternatives. The industry is thus benefited in efficiency, cost and safety.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A hands-free quick-change air tool configuration for a machining apparatus comprising:
    a tool holder configured to receive a normally hand-held air operated tool, the hand-held air operated tool being specifically designed and manufactured to be used by hand, the tool holder configured to hold a switch of the tool in a depressed and an "on" position;
    an air manifold operably receptive of the tool holder; and
    a plunger-type seal configuration operably interconnected to an air supply and in operable communication with the air manifold.

2. A hands-free quick-change air tool configuration for a machining apparatus as claimed in claim 1 wherein the air tool is a grinder.

3. A hands-free quick-change air tool configuration for a machining apparatus as claimed in claim 1 wherein the tool is a deburring tool.

4. A hands-free quick-change air tool configuration for a machining apparatus as claimed in claim 1 wherein the tool holder includes a body and a cap.

5. A hands-free quick-change air tool configuration for a machining apparatus as claimed in claim 1 wherein the tool holder maintains the air tool in the "on" position.

6. A hands-free quick-change air tool configuration for a machining apparatus comprising:
    a tool holder configured to receive a normally hand-held air operated tool, the hand-held air operated tool being specifically designed and manufactured to be used by hand;
    an air manifold operably receptive of the tool holder; and
    a plunger-type seal configuration operably interconnected to an air supply and in operable communication with the air manifold;
    wherein the air manifold includes plumbing having a switchable fluid port and an air inlet and a liquid inlet that both feed the switchable fluid port, the switchable fluid port capable of switching between delivering pressurized air and delivering coolant to the tool holder.

7. A hands-free quick-change air tool configuration for a machining apparatus as claimed in claim 1 wherein the plunger type seal configuration is engaged when a turret of the machining apparatus is in the engaged position.

8. A hands-free quick-change air tool configuration for a machining apparatus as claimed in claim 1 wherein the machining apparatus is a turret lathe.

9. A method for deburring a part in a machining apparatus comprising:
    installing the configuration as claimed in claim 1 in a machining apparatus by inserting the hand-held air operated tool into the tool holder and causing the switch to be depressed by the tool holder;
    inputting instructions to a control unit to cause the air tool to be aligned with the part; and
    inputting instructions to activate a solenoid associated with supplying air from an air source to the air manifold.

10. A method as claimed in claim 9 wherein the machining apparatus is a turret lathe.

11. A method as claimed in claim 9 wherein the method further comprises deburring without an operator reaching into the machining apparatus.

12. A hands-free quick-change air tool configuration for a machining apparatus comprising:
    a normally hand-held air operated tool, the hand-held air operated tool being specifically designed and manufactured to be used by hand, the hand-held operated tool including a paddle-type switch;
    a tool holder configured to receive the normally hand-held operated tool and to move the paddle-type switch to a depressed and on position when the normally hand-held air operated tool is received in the tool holder;
    an air manifold operably receptive of the tool holder; and
    a plunger-type seal configuration operably interconnected to an air supply and in operable communication with the air manifold.

* * * * *